United States Patent [19]

Check et al.

[11] Patent Number: 4,782,203

[45] Date of Patent: Nov. 1, 1988

[54] WIRE GUIDE FOR ELECTRIC DISCHARGE MACHINE

[75] Inventors: John M. Check, Chelsea; Myron Johnson, Freeland; George Barbulescu, Ann Arbor, all of Mich.

[73] Assignee: Raycon Textron Inc., Ann Arbor, Mich.

[21] Appl. No.: 39,065

[22] Filed: Apr. 16, 1987

[51] Int. Cl.$^4$ .................. B23H 1/00; B23H 7/10
[52] U.S. Cl. .................. 219/69 E; 219/69 W
[58] Field of Search ............. 219/69 W, 69 E, 69 G, 219/69 V, 138; 204/206, 224 M

[56] References Cited

U.S. PATENT DOCUMENTS

| | | | |
|---|---|---|---|
| 3,517,153 | 6/1970 | Check | 219/69 E |
| 3,943,322 | 3/1976 | Lehmann et al. | 219/69 W X |
| 4,205,212 | 5/1980 | Ullmann et al. | 219/69 W |
| 4,364,812 | 12/1982 | Inoue | 219/69 W |
| 4,605,834 | 8/1986 | Inoue | 219/69 W |
| 4,611,107 | 9/1986 | Inoue | 219/69 W |
| 4,613,740 | 9/1986 | Ichikawa | 219/69 W |
| 4,686,344 | 8/1987 | Nakayama | 219/69 W |

FOREIGN PATENT DOCUMENTS 186534  10/1983  Japan .................. 219/69 W

Primary Examiner—A. D. Pellinen
Assistant Examiner—Geoffrey S. Evans
Attorney, Agent, or Firm—John C. Evans

[57] ABSTRACT

A wire guide directs a wire electrode from a refeed mechanism in an electrical discharge machine EDM to a workpiece. The wire guide has ceramic inserts defining a precision guide slot for the electrode and wherein one of the inserts is carried by a deflectable member spring biased to damp the electrode so as to maintain concentricity of holes formed by the electrode and thereby closely control the hole diameter.

8 Claims, 3 Drawing Sheets

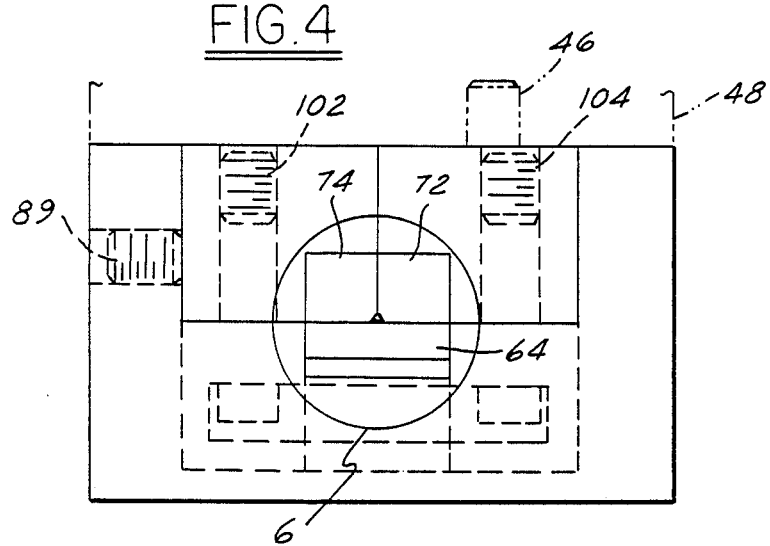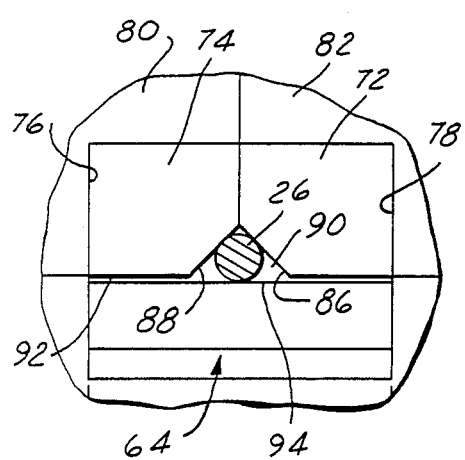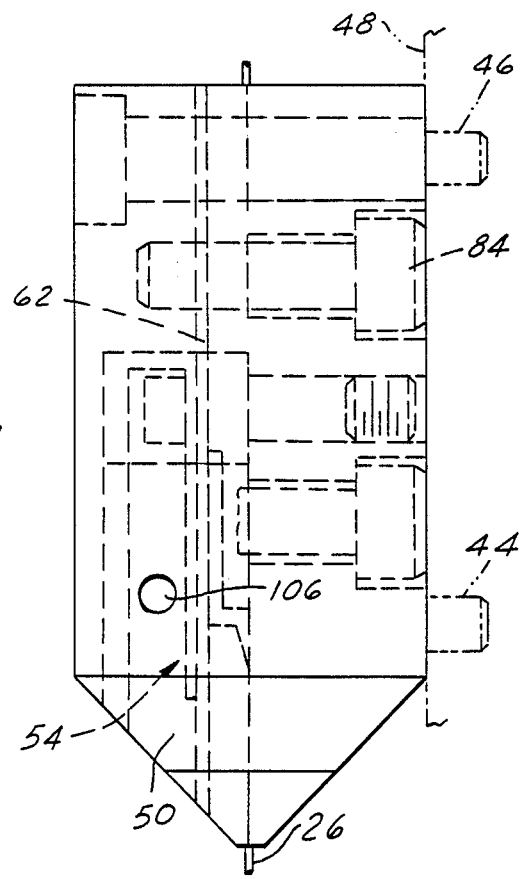

WIRE GUIDE FOR ELECTRIC DISCHARGE MACHINE

FIELD OF THE INVENTION

This invention relates to electric discharge machines (EDM); more particularly, it relates to a wire guide for use in apparatus for machining multiple parts or workpieces with substantially uniform accuracy.

BACKGROUND OF THE INVENTION

In many applications, electric discharge machining is used for the mass production of parts which must be machined to close tolerances. There are several factors which affect the repeatability of accuracy of machining by the EDM process including the process parameters of electrode size, spark energy, spark current, gap length, gap voltage and the wire guide used to direct the electrode to a workpiece. For example, when the EDM process is used to machine a small hole through a thin plate, the small dimensions of the wire electrode require a support system which is sufficiently accurate to support the electrode in all directions. Also, mechanical or electrical vibrations in the electrode system can result in variation in hole diameters. In the case of wire guides for directing electrodes with respect to an orifice plate for fuel injectors, for example, the electrode, even though closely guided, can vibrate in a manner so that accuracy in hole diameter cannot be achieved uniformly.

Accordingly, there is a need for obtaining improved uniformity and accuracy in guiding an electrode wire in EDM apparatus. Further, it should be achieved without affecting the various other parameters involved in improving accuracy of the EDM process.

A general object of this invention is to provide an improved wire guide for use in apparatus for electric discharge machining to obtain a high degree of repeatable accuracy in the machining of parts.

SUMMARY OF THE INVENTION

In accordance with this invention, apparatus is provided for electric discharge machining of workpieces on a mass production basis with greater workpiece feature formation repeatability than achieved heretofore. This is accomplished by dampening the electrode at precision guide slot inserts whereby the tolerance stack-up is compensated in the electrode support system so that uniformity of formation of hole dimensions and shape is achieved.

Further, according to the invention, a wire guide is provided for use in electric discharge machines which includes means which hold a wire electrode position to produce workpiece features having a specified size within predetermined tolerances. Specifically, multiple guide inserts are machined to form a precision slot for guiding a wire electrode and one of the inserts is spring biased to impose controlled dampening on the wire electrode so that the effectiveness of the electrical discharge is maintained to cause workpieces to be machined so that the size and shape of the feature is within predetermined tolerances.

BRIEF DESCRIPTION OF THE DRAWINGS

Further objects and advantages of the invention will appear from the following description taken together with the accompanying drawings in which:

FIG. 4 a top elevational view of the invention;

FIG. 5 is side elevational view of the invention;

FIG. 6 is an enlarged, fragmentary elevational view of ceramic inserts for guiding a wire electrode;

BEST MODE FOR CARRYING OUT THE INVENTION

Figure 1:
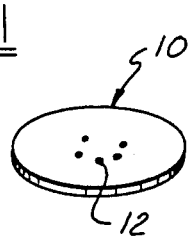
FIG. 1 is a perspective view of a workpiece formed by use of the present invention.

Referring now to the drawings, there is shown an illustrative embodiment of the invention in a method and an apparatus for electric discharge machining using an adaptive control system which adjusts a selected EDM parameter in response to a feedback signal representing workpiece measurement data. The adjustable EDM parameter is spark energy. A hole or set of holes is the workpiece feature to be machined to a specified size, as measured by its fluid flow capacity. It will be appreciated as the description proceeds that the invention may be embodied in many different forms and utilized for many different applications.

In the illustrative embodiment of the invention to be described, an electric discharge machining method and apparatus is utilized for machining a set of small holes in a thin plate. In particular, the example workpiece is an orifice plate for a fuel injection nozzle for use in an automotive engine. Such workpieces or parts must be manufactured in high volume using mass production techniques and must be held to very close dimensional tolerances. As shown in FIG. 1, the workpiece or part comprises a circular plate 10 with a set of six small holes 12 in a circular array surrounding the center of the plate 10. In the example workpiece, each of the holes has a specified diameter of six thousandths of an inch with a tolerance of plus or minus one ten thousandth of an inch. The set of holes of such size, taken collectively, has a certain fluid flow capacity. Measured flow capacity is used as an index of size.

Figure 2:
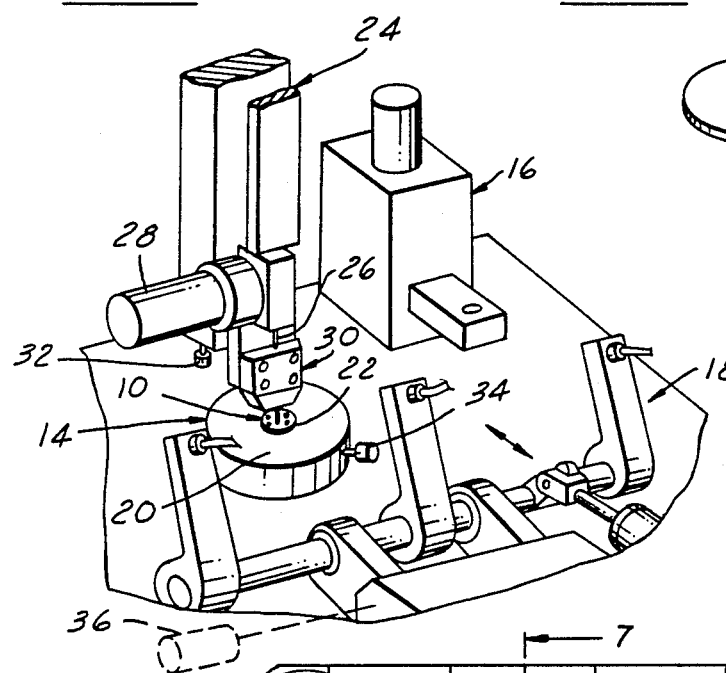
FIG. 2 is a fragmentary, diagrammatic view of an electrical discharge machine including the present invention.
Figure 3:
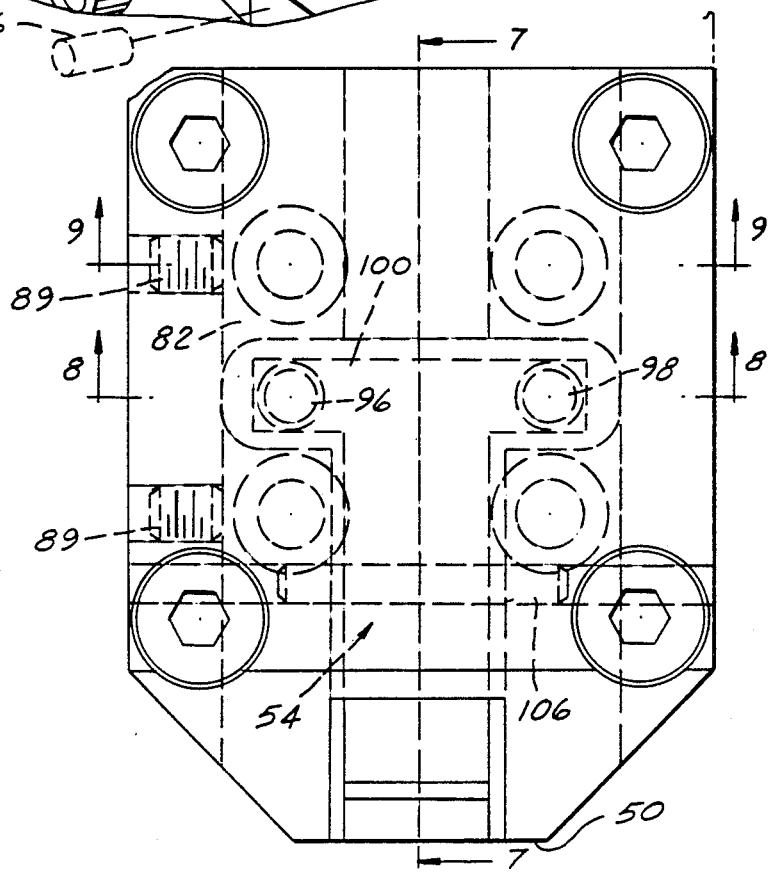
FIG. 3 is a front elevational view of the invention.
Figure 7:
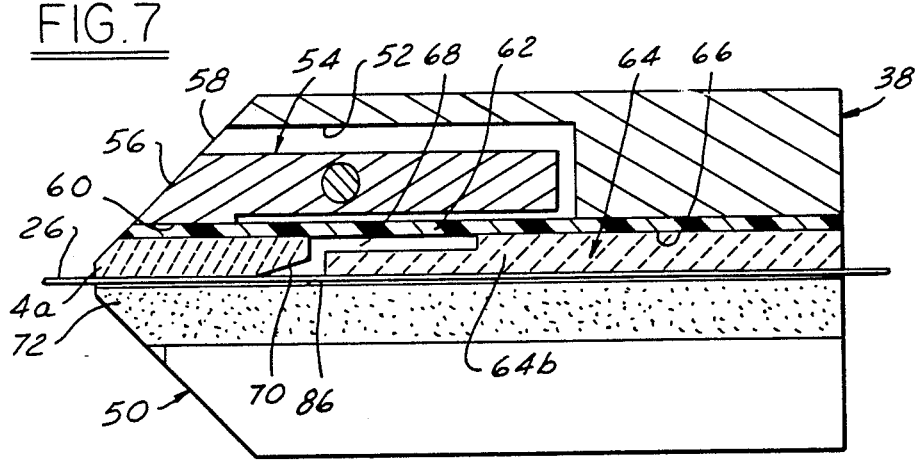
FIG. 7 is a longitudinal sectional view taken along the line 7—7 of FIG. 3 looking in the direction of the arrows.

The electric discharge machine embodying the invention is shown diagrammatically in FIG. 2. In general, it comprises a machining station 14, a test station 16 and a workpiece transfer mechanism 18 is adapted to move each workpiece through the successive stations.

If desired, the machine can include a workpiece feed station and a workpiece sorting station. Such stations and their operation are further discussed in copending U.S. Ser No. 781,115 filed Sept. 27, 1985, now U.S. Pat. No. 4,725,705, for Method and Apparatus for Electric Discharge Machining, the specification of which is incorporated herein by reference.

The machining station 14 comprises a workpiece holder 20 which has a nest 22 thereon adapted to receive the workpiece 10. The holder 20 is mounted on an index table or turret (not shown) which is adapted to rotate the holder 20 to position the workpiece 10 in six different angular positions, one for each hole to be machined. The head of the electric discharge machine comprises a carriage 24 for feeding a wire electrode 26 for machining the holes in the workpiece at the work station on the holder 20. The wire electrode 26 passes through a refeed mechanism 28 and a wire guide 30 to the workpiece. The refeed mechanism 28 is adapted to advance the electrode wire, which is supplied from a spool (not shown), relative to the carriage 24 upon retraction of the carriage after each machining operation. After each machining operation to form one of the holes 12, the downward limit of the carriage 24 is sensed by a limit switch 32 which causes the holder 20 to be indexed to place the next hole location at the work station on the holder. When the holder 20 is indexed to the position for machining the last hole in the workpiece, a limit switch 34 enables the actuation of a transfer drive 36 of the transfer mechanism 18. Upon completion of machining of the last hole in the workpiece the limit switch 32 causes energization of the drive 36 and the transfer mechanism 18 is actuated to transfer the workpiece 10 from the machining station 14 to the test station 16. The test station 16 and its operation are more specifically set forth in copending U.S. Ser. No. 781,115.

The workpiece 10 is electrically conductive so that when the proper gap is established between the wire electrode 26 and the workpiece 10 a spark is established and maintained during the electrical discharge machining process. A suitable process is fully described in copending U.S. Ser No. 781,115, it being understood, however, that the present invention is suitable for use with a wide range of EDM machines.

Referring now to FIGS. 3–9, the wire guide 30 of the present invention includes a housing 38 with spaced sidewalls 40, 42 each of which carry two spaced dowel pins 44, 46 that are located into a wire guide support 48 on the carriage 24.

The housing 38 has a tapered end 50 with a slot 52 therein which supports a spring biased pressure foot 54. The pressure foot 54 has an inclined surface 56 generally complementary to an inclined surface 58 on tapered end 50 to provide necessary relief in vicinity of the spark gap.

The pressure foot 54 more particularly includes a pad 60 that is bonded to one end of a deflectable sheet 62 of phenolic impregnated fiberglass. The sheet 62 has a first ceramic insert 64 bonded thereto on the opposed surface 66. The insert 64 has a slot 68 formed thereacross with a chamfer 70 that allows insert segment 64a to freely move with respect to insert segment 64b as the sheet 62 deflects.

Figure 9:
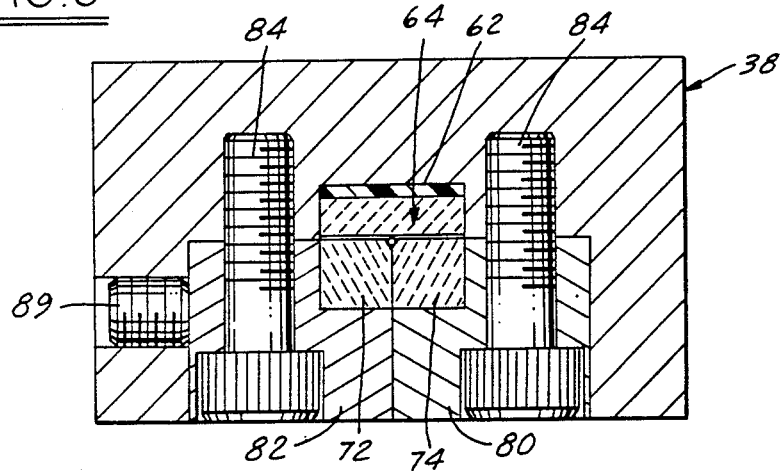
FIG. 9 is a cross-sectional view taken along the line 9—9 of FIG. 3 looking in the direction of the arrows.

The first ceramic insert 64 is associated with two other ceramic inserts 72, 74 carried in side slots 76, 78 in machined wire guide holders 80, 82. The inserts 72, 74 are bonded in place by suitable adhesive. The holders 80, 82 are secured to the housing 38 by screws 84 so that the ceramic inserts 72, 74 will be located to aligned edge chamfers 86, 88 thereon to form a V-slot 90 for guiding the electrode wire 26 through the wire guide 30. Side set-screws 89 engage the wire holder 82 as shown in FIG. 9 for presetting the lateral position of V-slot 90. While inserts 64, 72, 74 are disclosed as being formed of ceramic material, any other electrically insulated material would be suitable for use in practicing the invention.

As best shown in FIG. 6, the V-slot 90 in configured so that the surface 92 on the assembled inserts 72, 74 is maintained slightly below the upper tangency 94 of the diameter of electrode wire 26.

Figure 8:
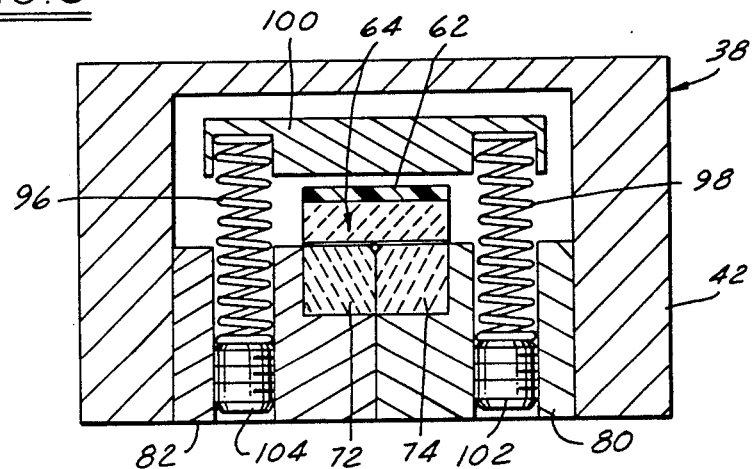
FIG. 8 is a cross-sectional view taken along the line 8—8 of FIG. 3 looking in the direction of the arrows.

A uniform spring biased dampening is imposed on the electrode wire 26 by means of spaced springs 96, 98 held in place between a cross-arm 100 of pressure foot 54 and set screws 102, 104 in holders 80, 82 as shown in FIG. 8. The springs 96, 98 bias against cross-arm 100 and cause pressure foot 54 to pivot counterclockwise about a pivot pin 105 located between walls 40, 42.

The pressure foot 54 thereby deflects the sheet 62 and the insert segment 64a against the wire electrode segment 26 in a manner to yieldingly grip the electrode 26 as it leaves the wire guide 30. One key aspect of this spring bias feature is that it compensates for tolerance stack-ups in the support/guide system for small diameter electrodes. Such electrodes make it difficult to machine guide grooves and slots with sufficient accuracy to support such wires in all directions. The problem is obviated by use of the present invention.

Another result of the invention is to dampen operational vibrations in the wire electrode and as a result more repeatable hole features are formed in the workpiece 10. The ceramic insert segment 64b and the ceramic inserts 72, 74 are relatively fixed with respect to the vibration dampening insert segment 64a so as to smoothly guide the wire electrode through the wire guide 30 during the refeed of wire electrode to compensate for electrode wear at the spark gap. While round holes are shown in the illustrated embodiment, the invention is equally applicable to guiding electrodes configured to produce other geometry holes resembling the geometry of the electrode.

Although the disclosure describes and illustrates a preferred embodiment of the invention, it is to be understood that the invention is not limited to such embodiment. Many variations and modifications will be apparent to those skilled in the art. For a definition of the invention reference is made to the appended claims:

What is claimed is:

1. In an EDM apparatus having a source of conductive wire electrode and a refeed mechanism for feeding a tip of the wire electrode through a wire guide having an inlet, outlet and surfaces to precisely locate the tip of the wire electrode in a spaced spark gap relationship with a workpiece so as to produce a hole through the workpiece when current pulses are directed from the tip of the wire electrode to the workpiece and wherein the tip of the wire electrode is subject to spark induced vibrations the improvement comprising:

first and second electrical insulating guide means in the wire guide for controlling the direction of feed of the wire electrode from the refeed mechanism to the spark gap at the tip of the electrode;

said first electrical electrical insulating guide means being rigidly supported on the wire guide;

said second electrical insulating guide means having a segment thereon rigidly supported on the wire guide to form a fixed path for the feed of wire electrode material from the refeed mechanism to the spark gap formed between the tip and the workpiece;

said second electrical insulating guide means having another segment thereon movably supported on the wire guide to form an extension of the fixed path which is axially concentric of the fixed path; and means for resiliently biasing said another segment with respect to said first electrical insulating guide means at the outlet of the wire guide for dampening vibrations in the wire electrode between its tip and the outlet of the wire guide so as to maintain the tip in a desired concentricity as established by the fixed path formed between the rigidly supported first electrical insulating guide means and the another segment.

2. In an EDM apparatus having a source of conductive wire electrode and a refeed mechanism for feeding a tip of the wire electrode through a wire guide having an inlet, outlet and surfaces to precisely locate the tip of the wire electrode in a spaced spark gap relationship with a workpiece so as to produce a hole through the workpiece when current pulses are directed from the tip of the wire electrode to the workpiece and wherein the tip of the wire electrode is subject to spark induced vibrations for improvement comprising:

first and second guide means in the wire guide for controlling the direction of feed of the wire electrode from the refeed mechanism to the spark gap at the tip of the electrode;

said first guide means being rigidly supported on the wire guide;

said second guide means having a segment thereon rigidly supported on the wire guide to form a fixed path for the feed of wire electrode material from the refeed mechanism to the spark gap formed between the tip and the workpiece;

said second guide means having another segment thereon movably supported on the wire guide to form an extension of the fixed path which is axially concentric of the fixed path; and means for resiliently biasing said another segment with respect to said first guide means at the outlet of the wire guide for dampening vibrations in the wire electrode between its tip and the outlet of the wire guide so as to maintain the tip in a desired concentricity as established by the fixed path formed between the rigidly supported guide means and the another segment.

3. In the combination of claim 1 or 2, said first and second guide means being formed of ceramic block material to resist wear and friction between the wire electrode and the wire guide as wire is fed from the source to replace wire erosion at the tip of the conductive wire electrode.

4. In the combination of claims 1 or 2, said second guide means including a thin sheet of electrical insulating material; said second guide means having a slot formed between the fixed and movable portions thereof; said thin sheet bridging the fixed and movable portions and serving to support the movable portion for movement with respect to the fixed portion and returning the movable portion to a referenced position with respect to the fixed portion in opposition to the direction of the spring force acting thereon during vibration dampening of the wire electrode segment between the outlet of the wire guide and the wire electrode tip.

5. A wire electrode holder for guiding a wire electrode with respect to a workpiece having a hole formed therein by the tip of the wire electrode so as to establish a stable spark gap between the tip and the workpiece for electrically discharge machining a precision hole in the workpiece comprising:

a wire guide housing; first and second electrically insulating inserts located in the wire guide housing including guide surfaces thereon for directing a wire electrode from a source of material to the workpiece;

a third electrically insulating insert movable with respect to said first and second inserts for holding the wire electrode thereagainst; and means for spring biasing a wire electrode between said first, second and third electrically insulating nserts including a pressure foot, pivot means for pivotally ounting said pressure foot on said wire guide housing, a pring forcing said pressure foot in a first direction about said pivot means, and deflectable means bonded, respectively, to said pressure foot and said third electrical insulating insert.

6. A wire electrode holder for guiding a wire electrode tip to a spark gap at a conductive workpiece comprising:

an electrode housing;

insert means for electrically insulating said housing from an electrically energized electrode; said insert means including first guide means for guiding an electrode during movement of the electrode through said holder housing; said insert means including second guide insert means moveable with respect to said first guide means; and spring means for biasing said relatively movable first and second guide means with respect to each other;

said spring means including lever means pivotally supported on said housing; a compression spring in engagement with one of said lever means; and means connecting the opposite end of said lever means to one of said first and second guide means for pressure biasing a wire electrode therebetween to dampen vibrations therein.

7. A wire electrode for guiding a wire electrode tip from a source of wire to a conductive workpiece for establishing stable spark gap for electrically discharge machining the workpiece comprising:

a wire guide housing;

first and second ceramic inserts located within said wire guide housing including surfaces thereon for guiding an electrode during movement of the electrode through said wire guide housing;

a third ceramic insert moveable with respect to said first and second insert means for holding the electrode; and means for spring biasing a wire electrode between said first, second and third ceramic inserts including a pressure foot, pivot means for pivotally mounting said pressure foot on said wire guide housing, a spring forcing said pressure foot in a first direction about said pivot means, and deflectable means bonded, respectively, to said pressure foot and said third ceramic insert.

8. A wire electrode holder for guiding a wire electrode tip between a wire electrode supply and a spark gap at a conductive workpiece comprising:

an electrode housing;

insert means for electrically insulating said housing from an electrically energized electrode;

said insert means including first ceramic insert means for guiding and electrode during movement of the electrode through said holder housing;

said insert means including second ceramic insert means moveable with respect to said first ceramic insert means; and said spring means including lever means pivotally supported on said housing; a compression spring in engagement with one of said lever means; means connecting the opposite end of said lever means to one of said first and second ceramic insert means for pressure biasing a wire electrode therebetween to dampen vibrations therein.

* * * * *